Nov. 24, 1936. M. M. KEENER 2,061,969
PIN TICKET
Filed Oct. 26, 1932 3 Sheets-Sheet 1
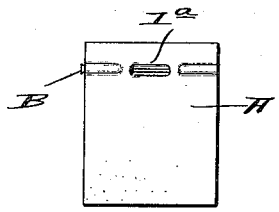
Inventor
Martin M. Keener
By Vernon E. Hedges
his Attorney

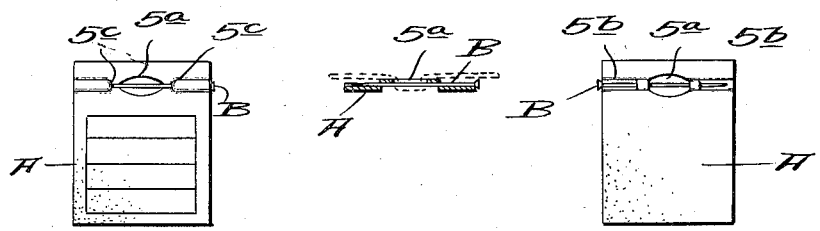
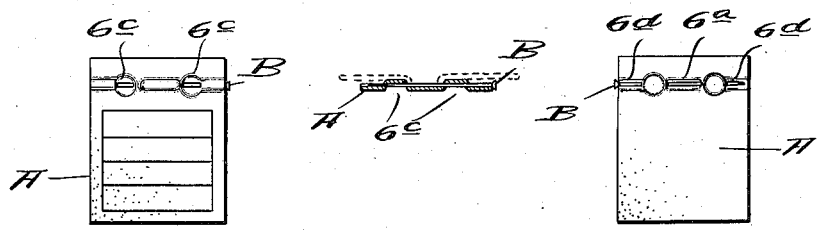
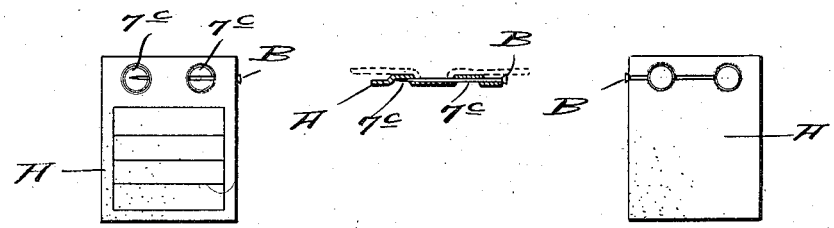
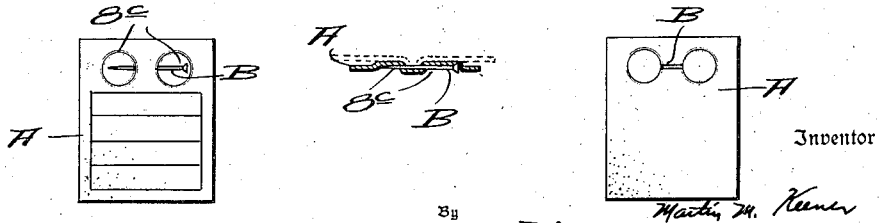

Nov. 24, 1936.   M. M. KEENER   2,061,969
PIN TICKET
Filed Oct. 26, 1932    3 Sheets-Sheet 3

Inventor
Martin M. Keener
By Vernon E. Hodges
Attorney

Patented Nov. 24, 1936

2,061,969

UNITED STATES PATENT OFFICE 2,061,969

PIN TICKET

Martin M. Keener, Lancaster, Pa.

Application October 26, 1932, Serial No. 639,691

5 Claims. (Cl. 40—25)

This invention relates to an improvement in pin tickets.

The object of the invention is to provide a pin ticket in which the pin is always in place in the ticket as a permanent part thereof, even when not attached to the fabric and the paper is shaped by embossing to receive the pin and to protect the pin point from pricking the fingers. The ticket is preferably of an elongated form made of paper, cardboard, or the like, and may be of a single or multiple plies and at an end thereof, the ticket is shaped by embossing, forming a groove to receive the pin and to protect the pin point. The point is housed and enclosed in the groove so that it is protected thereby.

In the accompanying drawings,

Figs. 1, 2 and 3 are front elevation, sectional, and rear views respectively, of one form of pin ticket embodying my invention;

Figs. 4, 5 and 6 are similar views of a slightly different form of the invention;

Figs. 7, 8 and 9 are similar views of another form of the invention;

Figs. 10, 11 and 12 are similar views of another form of the invention;

Figs. 13, 14 and 15 are similar views of another form of the invention;

Figs. 16, 17 and 18 are similar views of another form of the invention in which circular embossed grooves are provided;

Figs. 19, 20 and 21 are similar views of another form thereof;

Figs. 22, 23 and 24 are similar views of still another form thereof;

Figure 25:
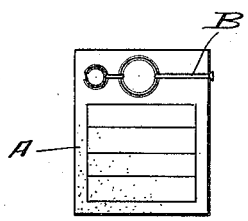
Figs. 25, 26 and 27 are similar views of another form thereof.

In the several forms of my invention which are only slightly different from each other, I employ a ticket which is preferably of paper and may be constructed of conventional ticket stock, being of one or more plies as may be found desirable. The ticket is designated A and is provided on the front side thereof with marking space A1 adapted to receive suitable indications for designating the fabric or material to which the ticket is applied. The ticket is intended to have its back side placed against the material and secured thereto by means of an ordinary pin B, which passes through a portion of the ticket A, and through a part of the fabric for securing the ticket to the fabric. In the various forms of my invention, this pin B extends transversely of an end portion of the ticket. To receive and enclose the pin and to protect the point thereof, I provide an embossed groove in the paper ticket which extends transversely of an end portion of the ticket and may be narrow and elongated or it may be round or some other suitable shape which is sufficient for the purpose. The ticket is shaped so that the pin B disposed in the embossed groove has at least a portion thereof exposed to the rear of the ticket to enable it to pass through the fabric to which the back of the ticket is applied.

In the form shown in Figs. 1, 2 and 3, the paper ticket is embossed with a part thereof open to the back and other parts open to the front, the portion 1a of the groove being open to the back of the ticket as shown in Fig. 3 and the portions 1b open to the front of the ticket extending from the ends of the portions 1a to the edges of the ticket. The pin B extends through the portions 1a and 1b and is protected thereby. The ticket is of sufficient width so that the pointed pin remains in the portion 1b of the groove and being thus enclosed, it cannot prick the fingers of a person applying the ticket or handling the fabric with the ticket applied.

In the form shown in Figs. 4, 5 and 6, the groove portion 2a is in the middle of the ticket A and is open at the back, while the groove portion 2b extends from one end of the portion 2a to an edge of the ticket while the portion 2c extends from the other end part way only to the edge, so that the pin B may be inserted from one edge of the ticket, but does not extend to the opposite edge and has its point protected within the groove portion 2c.

In the form shown in Figs. 7, 8 and 9, the groove portions 3c extend only part way from the opposite ends of the groove portion 3a to the edges of the pin ticket, so that both the head and point of the pin are enclosed within the groove portions 3c.

In Figs. 10, 11 and 12, the groove portion 4b extends to one edge of the ticket at the front and a short groove portion 4c is located on the other side of the back groove portion 4a and between the portion 4c and the adjacent edge of the ticket is a back groove portion 4d which receives the point of the pin and protects the same. In this form, the point of the pin is disposed at the back of the pin ticket.

In the form shown in Figs. 13, 14 and 15, the ticket has rear groove portions 5b extending to the edges thereof and at the inner ends of these portions 5b are front groove portions 5c extending to a central slot 5a in which the fabric is inserted for the passage of the pin therethrough. In this form, the pin is housed primarily at the back of the ticket and the pin point is at the back where it is disposed within one of the groove portions 5b.

In Figs. 16, 17 and 18, the central groove portions 6a is at the back for receiving the fabric and the pin and beside the same are front groove portions shown as round and designated 6c from which back groove portions 6d extend to the edges of the ticket and as shown in Fig. 18, the point of the pin B is housed within one of the latter at the back of the ticket.

In the form shown in Figs. 19, 20 and 21, a continuous groove is not used, but two round front grooves are embossed in the ticket from the front and are designated 7c and the pin B passes through the expanded portions at the back formed by the embossing of the grooves, so as to dispose the pin primarily at the back of the ticket but the point is shown as being enclosed within one of the embossed grooves 7c at the front of the ticket and is protected thereby. The space at the back between the expanded portions is sufficient for the pin to pass through the fabric in attaching the ticket thereto. In this form of the invention, the head of the pin is disposed at an edge of the ticket.

In Figs. 22, 23 and 24, similar embossed grooves 8c are provided but the pin B has both its head and point enclosed within these grooves, the head being located within one groove and point in the other. The pin passes through the fabric at the back of the ticket between the expanded portions formed in embossing the grooves 8c.

Figure 26:
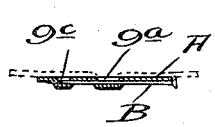
Figure 27:
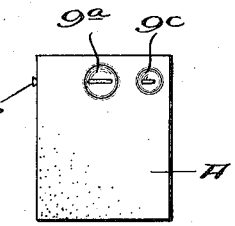

In Figs. 25, 26 and 27, a central groove 9a is embossed in the back of the ticket through which the pin extends in fastening the ticket to the fabric and a small groove 9c is disposed at one side of the groove 9a and receives and protects the point of the pin which extends into this groove 9c.

Figure 28:
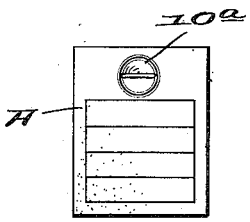
Figs. 28, 29 and 30 are similar views of another form thereof.
Figure 29:
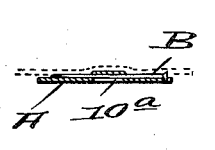
Figure 30:
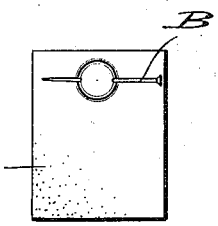

In Figs. 28, 29 and 30, a single embossed groove 10a is formed in the front of the ticket A, the ticket stock being expanded at the back and the pin passes therethrough as shown in Fig. 29, engaging the fabric on opposite sides of the expanded portion and the pin being on the back of the ticket has its point protected thereby.

Figure 31:
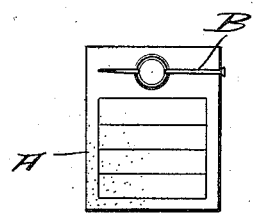
Figs. 31, 32 and 33 are similar views of another form thereof.
Figure 32:
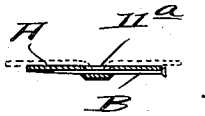
Figure 33:
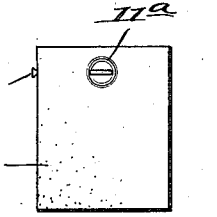

The central embossed groove 11a in Figs. 31, 32 and 33 is formed in the back of the ticket with the ticket stock expanded at the front for the pin to pass therethrough and engage the fabric in the groove 11a.

Figure 34:
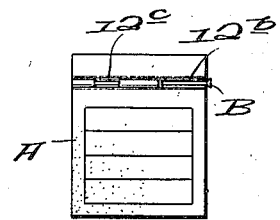
Figs. 34, 35 and 36 are similar views of still another form of the invention.
Figure 35:
Figure 36:
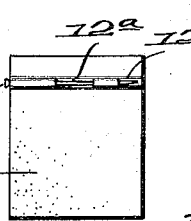

A form more along the line of that shown in Figs. 10, 11 and 12 is illustrated in Figs. 34, 35 and 36 in which the central groove 12a at the back has a front groove portion 12b on one side thereof and extending to the side edge, while the opposite side has a groove portion 12c at the front and a groove portion 12d at the back, the latter extending from the portion 12c to the adjacent edge and receiving and enclosing the point of the pin which is disposed at the back of the ticket, so as to be thereby protected.

In the several forms of the invention, the pins are permanent parts of the pin tickets, so that they are always in place for the attachment of the tickets to the fabrics and the paper stock forming the tickets is embossed to receive the pins and protect the points from pricking the fingers. The point of the pin is either housed within an embossed groove or is located at the back of the ticket, so that it is completely protected thereby. An ordinary straight pin is used so as to enable it to be easily removed and inserted into the fabric in applying the ticket thereto, and also so that no threads may be pulled or torn in the process, as the common pin has a point that is perfectly smooth and will not pull or tear threads or start runs in hose, etc. The reference in the claims to the ends of the groove or groove portion is intended to apply not only to the ends of an elongated groove, but also to opposite sides of a round or other groove not elongated.

I claim:

1. A pin ticket comprising a paper ticket of elongated shape having a marking area arranged on the front side extending from one end portion thereof, the opposite end portion having an embossed groove extending transversely of the ticket and spaced inwardly from the adjacent end edge thereof, said groove having different side portions thereof open respectively to the front and back sides of the ticket, and a pin extending through the groove and housed therein.

2. A pin ticket comprising a paper ticket of elongated shape having a marking area arranged on the front side extending from one end portion thereof, the opposite end portion having an embossed groove extending transversely of the ticket and spaced inwardly from the adjacent end edge thereof, said groove having different side portions thereof open respectively to the front and back sides of the ticket, and a pin extending through the groove and housed therein, said pin being arranged to attach the ticket to the fabric at the back side thereof, and the point of the pin being disposed within a portion of the groove back of the front surface of the ticket.

3. A pin ticket comprising a ticket having an embossed groove therein and extending from one edge of the ticket toward the opposite edge with different transversely spaced side portions thereof open respectively to opposite sides of the ticket, and a pin extending through said groove with the head thereof disposed at the edge of the ticket to which the groove extends.

4. A pin ticket comprising a ticket having a transversely extending embossed groove therein with different transverse portions thereof pressed in opposite directions from the plane of the ticket and open respectively to opposite sides of the ticket, and a pin extending through the groove and through the material pressed in opposite directions to form the groove for attaching the ticket to fabric.

5. A pin ticket comprising a ticket having two approximately round embossed grooves therein spaced transversely of the ticket and pressed out of the plane of the ticket a distance sufficient to receive a pin between the ticket and the material displaced to form the groove, and a pin extending through adjacent sides of the grooves with the point thereof arranged in one of the grooves and the head in the other groove.

MARTIN M. KEENER.